April 11, 1961     C. H. MORRISSEY     2,979,340
AUTOMOBILE SHOE SCRAPER AND BRUSH ASSEMBLY
Filed Jan. 28, 1959
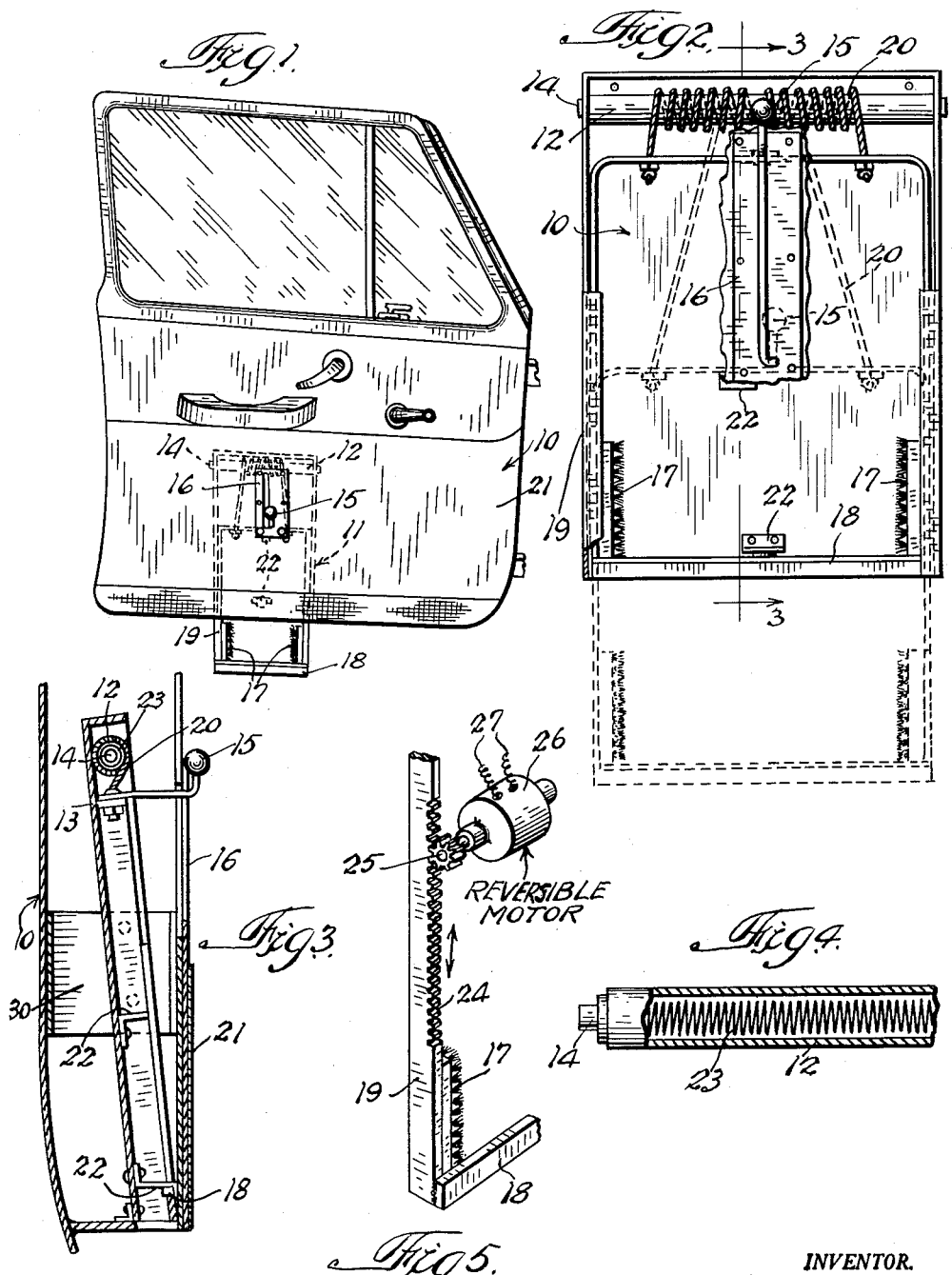
INVENTOR.
CARL H. MORRISSEY.
BY
Herbert B. Keil United States Patent Office 2,979,340
Patented Apr. 11, 1961

2,979,340
AUTOMOBILE SHOE SCRAPER AND BRUSH ASSEMBLY

Carl H. Morrissey, Rte. 1, Box 180, Naperville, Ill.

Filed Jan. 28, 1959, Ser. No. 789,557

4 Claims. (Cl. 280—164)

The present invention relates to an improved shoe scraper and brush. More particularly the subject invention is directed to a scraper and brush which can be conveniently located within the door of a modern automobile.

One of the problems frequently encountered by automobile drivers and passengers is that of removing mud and/or snow from their shoes before entering the vehicle. It is especially advantageous to have a cleaning device for shoes available on rainy and snowy days. Not only is an automobile scraper and brush assembly desirable for purposes of protecting upholstery, seat covers, etc., but it also has an important safety feature. The use of such a device prevents the transfer of slippery mud or snow from shoes to brake, clutch, and acceleration pedals.

In those years during which cars were manufactured with running boards, a scraping or brushing device could be conveniently suspended from this portion of the car. Since the elimination of the running board, however, no device prior to the present invention was available that could be suitably adapted for use with modern automobiles.

It is, therefore, an object of the present invention to provide a shoe scraper and brush which can be mounted in an inconspicuous place in a car.

It is a further object of the invention to provide a shoe scraper and brush assembly which does not mar the appearance of the car upholstery.

Another object of the invention is to provide a shoe scraper and brush of improved construction.

Other objects will become readily apparent to one skilled in the art from the following detailed description of the invention, taken in conjunction with the accompanying drawing, in which:

Figure 1 is an elevation of the scraper and brush assembly shown mounted within the door of an automobile and in an extended position;

Figure 2 is an enlarged elevation of the scraper in its retracted position, with its extended position shown by the dotted lines;

Figure 3 is a cross-section view through the lifting mechanism and scraper and brush device, substantially on the plane indicated by the line 3—3 of Figure 2;

Figure 4 is a partial section view of the torsion spring assembly of Figure 2; and Figure 5 is an alternative embodiment of the invention showing another means of raising and lowering the subject scraper and brush assembly.

In Figure 1, a conventional automobile door 10 is shown as including shoe scraper and brush assembly 11 of the present invention in its extended position. Pulley sleeve 12 is mounted on fixed assembly frame 13 by means of pin 14. Operating lever 15 is movably positioned within guide plate 16. Brushes 17 and scraper bar 18 are mounted on scraper and brush frame 19. Cord 20 is wound about sleeve 12 and is attached to frame 19. Guide plate 16 is attached to upholstery 21 by suitable means.

Shoe scraper assembly 11 is shown in greater detail in Figure 2. Scraper and brush frame 19 is in its elevated position. Pulley cord 20 is wound about sleeve 12, which in turn is attached through pin 14 to pan shaped assembly 13. Operating lever 15 is in its raised position within the channel formed by guide plate 16. Stop plates 22 confine the movement of brush and scraper frame 19 to the area between the plates. Stop plates 22 are fixedly mounted on pan shaped assembly 13. Scraper and brush frame 19 follows a consistent path due to the guide channel formed by guides 28. These guides are lappedover portions of the sides of assembly 13.

Figure 3 is a cross-sectional view of the scraper and brush assembly showing its position within door 10. Once again, scraper and brush frame 19 is in its raised position and pulley cord 20 is wound about sleeve 12. Spring 23 is within sleeve 12 and is attached to pin 14. Operating lever 15 is movably positioned within the channel formed by plate 16. Spring 23 is attached to lever 15 by a suitable means such as nut and bolt 29. Spacer 30 separates the inner and outer faces of door 10. Pan shaped assembly 13 is riveted to spacer 30 or to some other convenient structure within door 10. As is indicated in this figure, fixed assembly 13 and movable frame 19 are angled so that scraper bar 18 will be more accessible when door 10 is opened. Frame 19 passes through an appropriately sized hole which is cut out of the bottom panel of door 10. In addition to being riveted to spacer 30, assembly 13 is also fastened to the bottom panel of door 10 by two or more angle brackets.

Figure 4 is an enlarged section view of pulley assembly which includes sleeve 12, pin 14, and torsion spring 23. When cord 20 is unwound, tension is placed on spring 23 which causes sleeve 12 to rewind. Spring 23 is secured to sleeve 12 and to fixed assembly frame 13.

An alternate embodiment of the present invention is shown in Figure 5. If it is desirable, the raising and lowering of brush and scraper frame 19 can be accomplished by reversible motor 26. In this instance, frame member 19 would constitute a rack which would cooperate with pinion 25 of reversible motor 26. Wires 27 preferably are connected to a button or toggle switch located on the dashboard of the automobile. The use of motor 26 would eliminate the need for operating lever 15 and for guide plate 16.

It is apparent from the above description that the subject scraper and brush assembly can be placed conveniently within the door of a modern automobile. That is, it can be mounted between the upholstery of the car and the outer surface of the door. In such a way the brush and scraper is not in view at all times but is available for use when it is needed.

Obviously, many modifications and variations of the invention as hereinbefore set forth may be made without departing from the spirit and scope thereof, and, therefore, only such limitations should be imposed as are indicated in the appended claims.

I claim:

1. A vehicle accessory for cleaning footgear telescopically mounted within a door shell which comprises: a frame member rigidly secured between the interior and exterior panels of a vehicle door; a reciprocable assembly slidably mounted on said frame member between a fully withdrawn and a fully extended position, said assembly being extendable with respect to said frame member through an opening in the bottom of said door; cleaning means attached to the lower portion of said assembly, said cleaning means being positioned to enable the wiping of footgear thereon when said assembly is at the extended position; and means to selectively lower and raise said assembly with respect to said frame member.

2. A vehicle accessory for cleaning footgear telescopically mounted within a door shell which comprises: a frame member rigidly secured between the interior and exterior panels of a vehicle door; a reciprocable assembly slidably mounted on said frame member between a fully withdrawn and a fully extended position, said assembly being extendable with respect to said frame member through an opening in the bottom of said door; cleaning means attached to the lower portion of said assembly, said cleaning means being positioned to enable the wiping of footgear thereon when said assembly is at the extended position; spring means attached to said assembly to normally urge said assembly to the withdrawn position; and a handle attached to said assembly for manually moving same to the extended position.

3. A vehicle accessory for cleaning footgear telescopically mounted within a door shell which comprises: a frame member rigidly secured between the interior and exterior panels of a vehicle door; a reciprocable assembly slidably mounted on said frame member between a fully withdrawn and a fully extended position, said assembly being extendable with respect to said frame member through an opening in the bottom of said door; cleaning means attached to the lower portion of said assembly, said cleaning means being positioned to enable the wiping of footgear thereon when said assembly is at the extended position; and an electric motor operatively associated with said assembly for moving said assembly between the withdrawn and extended positions.

4. A vehicle accessory for cleaning footgear telescopically mounted within a door shell which comprises: a frame member rigidly secured between the interior and exterior panels of a vehicle door; a reciprocable assembly slidably mounted on said frame member between a fully withdrawn and a fully extended position, said assembly being extendable with respect to said frame member through an opening in the bottom of said door; cleaning means attached to the lower portion of said assembly, said cleaning means being positioned to enable the wiping of footgear thereon when said assembly is at the extended position; a gear means connected to said assembly; and an electric motor operatively connected to said gear means for moving said assembly between the withdrawn and extended positions.

References Cited in the file of this patent

UNITED STATES PATENTS

| | | |
|---|---|---|
| 1,389,201 | Linville | Aug. 30, 1921 |
| 2,677,553 | Miller | May 4, 1954 |
| 2,797,104 | Drobney | June 25, 1957 |
| 2,818,594 | Dawkins | Jan. 4, 1958 |